US010344146B2

(12) United States Patent
Hardiman et al.

(10) Patent No.: US 10,344,146 B2
(45) Date of Patent: Jul. 9, 2019

(54) SILICA MASTERBATCH MADE WITH EMULSION AND SOLUTION RUBBER

(71) Applicant: Industrias Negromex, S.A. de C.V., Altamira (MX)

(72) Inventors: Christopher J. Hardiman, Farmington, CT (US); Xuan Fu, Sugar Land, TX (US); Robert J. Scribner, Hermann, MO (US); Julian Maldonado Valenzuela, Tampico (MX)

(73) Assignee: Industrias Negromex, S.A. de C.V., Altamira (MX)

( * ) Notice: Subject to any disclaimer, the term of this patent is extended or adjusted under 35 U.S.C. 154(b) by 11 days.

(21) Appl. No.: 15/655,615

(22) Filed: Jul. 20, 2017

(65) Prior Publication Data
US 2017/0313857 A1 Nov. 2, 2017

Related U.S. Application Data

(63) Continuation of application No. 14/625,979, filed on Feb. 19, 2015, now Pat. No. 9,738,776.

(51) Int. Cl.
| | | |
|---|---|---|
| C08J 3/16 | (2006.01) | |
| C08J 3/22 | (2006.01) | |
| C08K 9/06 | (2006.01) | |
| B01D 3/38 | (2006.01) | |
| C08F 2/44 | (2006.01) | |
| C08L 21/00 | (2006.01) | |
| C08L 21/02 | (2006.01) | |
| C08K 9/00 | (2006.01) | |
| C08K 9/04 | (2006.01) | |

(52) U.S. Cl.
CPC .................. *C08K 9/06* (2013.01); *C08F 2/44* (2013.01); *C08L 21/00* (2013.01); *C08L 21/02* (2013.01); *B01D 3/38* (2013.01); *C08J 3/16* (2013.01); *C08J 3/22* (2013.01); *C08K 9/00* (2013.01); *C08K 9/04* (2013.01); *C08L 2310/00* (2013.01); *C08L 2314/00* (2013.01)

(58) Field of Classification Search
None
See application file for complete search history.

(56) References Cited

U.S. PATENT DOCUMENTS

| | | | |
|---|---|---|---|
| 3,686,219 | A | 8/1972 | Burke |
| 3,689,451 | A | 9/1972 | Burke |
| 3,689,452 | A | 9/1972 | Burke |
| 3,694,398 | A | 9/1972 | Burke |
| 3,700,690 | A | 10/1972 | Burke |
| 3,716,513 | A | 2/1973 | Burke |
| 3,768,537 | A | 10/1973 | Hess et al. |
| 3,840,382 | A | 10/1974 | Burke |
| 3,873,489 | A | 3/1975 | Thurn et al. |
| 4,072,701 | A | 2/1978 | Pletka et al. |
| 4,076,550 | A | 2/1978 | Thurn et al. |
| 4,099,981 | A | 7/1978 | Mui et al. |
| 5,205,972 | A | 4/1993 | Kafka |
| 5,440,064 | A | 8/1995 | Agostini et al. |
| 5,711,904 | A | 1/1998 | Eswaran et al. |
| 5,763,388 | A | 6/1998 | Lightsey et al. |
| 5,908,660 | A | 6/1999 | Griffith et al. |
| 5,919,298 | A | 7/1999 | Griffith et al. |
| 5,985,953 | A | 11/1999 | Lightsey et al. |
| 6,180,710 | B1 | 1/2001 | Hergenrother et al. |
| 6,342,552 | B1 | 1/2002 | Hergenrother et al. |
| 6,342,560 | B1 | 1/2002 | Okel |
| 6,407,153 | B1 | 6/2002 | Von Hellens |
| 6,465,670 | B2 | 10/2002 | Thise et al. |
| 6,521,691 | B1 | 2/2003 | Agostini et al. |
| 6,559,329 | B2 | 5/2003 | Pohl et al. |
| 6,579,929 | B1 | 6/2003 | Cole et al. |
| 6,617,325 | B1 | 9/2003 | Lehmann-Lintz et al. |
| 6,646,028 | B2 | 11/2003 | Lehmann-Lintz et al. |
| 6,649,684 | B1 | 11/2003 | Okel |
| 6,713,534 | B2 | 3/2004 | Goerl et al. |
| 6,720,369 | B2 | 4/2004 | Goerl et al. |
| 6,736,891 | B1 | 5/2004 | Bice et al. |
| 6,740,704 | B2 | 5/2004 | Konno et al. |
| 6,822,045 | B2 | 11/2004 | Miyatake et al. |
| 7,056,449 | B2 | 6/2006 | Hoefler |
| 7,101,922 | B2 | 9/2006 | Chen et al. |
| 7,307,121 | B2 | 12/2007 | Zhang et al. |
| 7,619,028 | B2 | 11/2009 | Watanabe et al. |

(Continued)

FOREIGN PATENT DOCUMENTS

| | | |
|---|---|---|
| JP | 2005075900 A | 3/2005 |
| WO | WO 2007040143 A1 | 4/2007 |
| WO | WO 2010/011345 A1 | 1/2010 |

OTHER PUBLICATIONS

Machine translated English equivalent of JP 2005-75900, Mar. 2005.

(Continued)

*Primary Examiner* — Richard A Huhn
(74) *Attorney, Agent, or Firm* — Stephen S. Hodgson

(57) ABSTRACT

The present invention provides a process for making a silica masterbatch that contains hydrophobated silica, solution-made rubber and emulsion-made rubber. Hydrophobated silica is mixed into a latex emulsion. Solution-rubber crumb in an aqueous suspension is mixed into the latex emulsion, which is coagulated, and a crumb is recovered, further homogenized, dried and baled to yield the silica masterbatch. A well-dispersed mixture of hydrophobated silica and emulsion-made rubber is added into a steam distillation step of a solution-rubber process from which a silica masterbatch is recovered. The emulsion-made rubber can be omitted to make a silica masterbatch of solution rubber and silica without emulsion rubber. The silica masterbatch has physical properties similar to those found in a comparable dry-mixed composition, but the silica masterbatch can be incorporated more easily and less expensively into tires and other rubber products than the dry-mixed composition.

13 Claims, No Drawings

(56) References Cited

U.S. PATENT DOCUMENTS

| | | |
|---|---|---|
| 7,790,798 B2 | 9/2010 | Chen et al. |
| 8,357,733 B2 | 1/2013 | Wallen et al. |
| 8,865,799 B2 | 10/2014 | Wallen et al. |
| 2003/0036593 A1* | 2/2003 | Goerl ............... C08J 3/215 524/261 |
| 2003/0114559 A1 | 6/2003 | Su et al. |
| 2003/0119946 A1 | 6/2003 | Chen et al. |
| 2004/0014869 A1 | 1/2004 | Wong et al. |
| 2005/0009955 A1 | 1/2005 | Cohen |
| 2006/0086450 A1 | 4/2006 | Hogan et al. |
| 2007/0155890 A1 | 7/2007 | Chen et al. |
| 2007/0167555 A1* | 7/2007 | Amino ............... B60C 1/00 524/495 |
| 2008/0004375 A1 | 1/2008 | Kondo et al. |
| 2008/0113206 A1 | 5/2008 | Hoy et al. |
| 2008/0227910 A1 | 9/2008 | Odaka |
| 2009/0163633 A1 | 6/2009 | Ko et al. |
| 2010/0022684 A1* | 1/2010 | Wallen ............... C08J 3/215 523/334 |
| 2012/0322925 A1 | 12/2012 | Arigo et al. |
| 2013/0203914 A1 | 8/2013 | Debnath et al. |
| 2013/0203915 A1 | 8/2013 | Arigo et al. |
| 2015/0011678 A1 | 1/2015 | Bibette et al. |

OTHER PUBLICATIONS

International Preliminary Report on Patentability for corresponding International Application No. PCT/IB2015/000760 and Search Report WO 2015/132666 A3.

* cited by examiner

SILICA MASTERBATCH MADE WITH EMULSION AND SOLUTION RUBBER

CROSS REFERENCE TO RELATED APPLICATIONS

This is a continuation of U.S. patent application Ser. No. 14/625,979 filed on Feb. 19, 2015, which is incorporated by reference.

FIELD OF THE INVENTION

This invention pertains to a process for making a silica-filled-rubber masterbatch that includes rubber made using a solution process, rubber made using an emulsion process and silica hydrophobated with a silane compound. The masterbatch is useful for making rubber formulations, particularly for making tires.

BACKGROUND OF THE INVENTION

Rubber is made in an emulsion or wet process in water or in a solution process in an organic solvent. Various monomers can be used and are polymerized in a free-radical polymerization process for emulsion rubber or an anionic polymerization process for solution rubber. In a typical application for the emulsion process, styrene and butadiene monomers are mixed together in water and additives including a modifier, an emulsifier and an activator are added to the solution to form a feed stream. The feed stream is fed to a heat exchanger that removes heat from the feed stream. An initiator is added, and the feed stream with the initiator flows through a series of stirred reactors. Polymerization occurs as the material flows through the reactors and continues as long as styrene and butadiene monomer units are available in the solution. To stop the polymerization at a desired polymer chain length, a short-stopping agent, such as hydroquinone, is added. The reactor product stream flows into a blowdown tank, and steam is added to strip out styrene and butadiene monomer. An aqueous latex is collected in tanks. A coagulating agent is added to the tanks, and a rubber crumb is formed, recovered, dried and baled for shipment to a tire or other manufacturer of final rubber products.

In a typical application for the solution process, styrene and butadiene monomers are initiated by alkyl lithium compounds in an organic solvent and are polymerized via anionic polymerization. A nitrogen blanket is typically required for the polymerization process. Randomization agents are usually added to produce a random copolymer. The microstructure of the copolymer, including vinyl content, molecular weight distribution and end-chain or in-chain functionalization, may be fine-tuned under different reaction conditions. After the polymerization process, the polymer solution is flash-distilled to form a more concentrated solution, which is then distilled with steam to remove the organic solvent and yield a rubber crumb. Dispersants and coagulants are generally added in the aqueous phase to control the size of the crumb. The crumb may be further stripped by steam and then filtered, dried and baled for sale.

In making tires and other rubber products, it is desirable to mix silica with an elastomer or rubber to improve certain properties of the elastomer. It is well known to incorporate silica into rubber using a dry mixing process, where a material is put on the surface of the silica during the mixing process to allow it to blend into the rubber. When the silica is coated with such an agent, the silica is referred to as hydrophobated and any material used to make hydrophobated silica is a hydrophobating agent. Silane compounds have been developed as hydrophobation agents. Processes for incorporating silica into rubber using the dry mixing process have been effective, but are time-consuming and energy-intensive. In the dry mixing process, rubber, silica, a silane and some of the compounding ingredients are fed into a Banbury rubber mixer, where the silica reacts with the silane to form a reaction mix compound. This pass may take 10 minutes or longer and greatly reduces the efficiency of the mixing operation. The mixing process requires a great deal of time, capital and operating and maintenance expense. Further, ethanol from the silane must be removed in the mixing step or in a downstream processing step. Rubber mixing facilities are not designed to function as chemical plants, and extra equipment must be installed to either isolate or to burn the alcohol so as to meet environmental standards. The reaction mix compound is further mixed in a remill step, where additional ethanol may be removed and additional compound ingredients may be added. This pass, however, is used primarily to improve the dispersion of the silica and reduce the Mooney viscosity of the stock. The remilled stock is combined with curatives in a final mix to produce a rubber compound suitable for use in tire tread stock.

Rather than mixing silica into rubber after the rubber has been made, silica can be added to the process in which rubber is made to make a silica-rubber masterbatch. One problem in making a silica-rubber masterbatch is when untreated silica is added to an emulsion of styrene-butadiene rubber or SBR (the emulsion or wet process), or to a solution of SBR in an organic solvent (the solution process), the silica does not completely incorporate into the polymer and separates as fines when coagulated. These fines not only reduce the value of the masterbatch, but also cause a processing problem in that the fines have to be disposed of or recycled.

Silica-filled rubber masterbatch has been made successfully by incorporating the silica into rubber as the rubber is made in an emulsion process. Silica can be hydrophobated efficiently in an aqueous setting with common silane compounds. In the tire industry, silane compounds that contain sulfur are commonly used because the sulfur provides active sites for coupling the silane compound to the polymer chains in the mixing steps. The dispersion of silica in rubber is strongly dependent on the degree of hydrophobation of the silica. The dispersion of the silica in the polymer can strongly influence the final properties of the rubber compound, such as wet traction, rolling resistance, and tread wear. It is often advantageous to make a silica-rubber masterbatch and dilute it down to a desired level of silica during mixing with rubber that does not contain silica, and thus avoid poor performance of a final rubber product due to a poor dispersion of silica in the rubber, which can occur in dry mixing for a variety of reasons.

U.S. Pat. No. 8,357,733, issued to Wallen et al., discloses a process for hydrophobating silica and a process for making a silica-filled-rubber masterbatch using rubber made in an emulsion process. The silica was hydrophobated to make it compatible with the rubber, and a hydrophobation agent was used that binds to rubber in a vulcanization process for incorporating the silica into a final rubber product, particularly a tire. U.S. Patent Application Pub. Nos. 20120322925, 20130203914 and 20130203915 disclose a process for hydrophobating silica and for making silica-rubber masterbatch with various elastomers in aqueous conditions. The hydrophobation process of the silica is performed with a silane compound, and the hydrophobated silica is mixed into a latex and incorporated into rubber during coagulation in an emulsion process.

Rubber product manufacturers, including tire manufacturers, prefer to incorporate some rubber made using a solution process into their products for particular properties that solution-made rubber imparts in the final product, particularly in tires. Although it has not been possible, or at least not economical, to make a silica-rubber masterbatch similar to the one disclosed in the U.S. Pat. No. 8,357,733 using rubber made in a solution process, where the rubber is made in an organic solvent, efforts have been made to provide a mixture of silica and solution-made rubber. U.S. Pat. No. 7,307,121, issued to Zhang, treats silica in an organic solvent with a mercaptosilane and a silane coupling agent such as bis(triethoxysilylpropyl) disulfide (TESPT). The treated silica is blended into an organic solution of SBR, and a masterbatch of solution-made rubber and silica is recovered by steam stripping to remove solvent. U.S. Pat. No. 6,025,415, issued to Scholl, describes a process for the production of mixtures of solution rubbers and surface-modified oxidic or siliceous fillers. Solution rubbers were mixed with surface-treated silica in solvent, and both were added dropwise into hot water and steam to form a uniformly distributed silica mix. U.S. Pat. No. 6,713,534, issued to Goerl et al., describes a process for making a fine-particle rubber powder, which included suspending one or more silicatic fillers and one or more bifunctional organosilicon compounds or a silicatic filler modified with an organosilicon compound in water to obtain a suspension, which was adjusted to a pH of 5 to 10. Rubber, which was made by the solution and/or the emulsion process, was dissolved in an organic solvent, and the resulting solution was added to the suspension. The organic solvent was removed to obtain a rubber powder in water, and the water was removed to obtain the fine-particle rubber powder. U.S. Pat. No. 7,790,798, issued to Chen, describes a method for making a silica-rubber masterbatch that contained a diene elastomer and silica in an organic solvent. An unhydrophobized precipitated silica having a first average particle size was mixed and ground in a first organic solvent, and a ground silica slurry having a reduced second average particle size was formed. The ground silica slurry was mixed with a diene elastomer in a second organic solvent; and the solvent was removed to form a solution masterbatch preparation.

A silica-filled-rubber masterbatch has not been commercialized that uses rubber made in a solution process, possibly because the incompatibility between inorganic silica and rubber made in an organic solvent has not been overcome satisfactorily. Consequently, there remains a need for a silica-filled-rubber masterbatch that contains rubber made using a solution process, where the masterbatch can be economically manufactured and where the silica is hydrophobated in a manner such that the silica will become sufficiently homogeneously mixed into the rubber and bound to the rubber during curing to produce a vulcanizate having acceptable properties.

SUMMARY OF THE INVENTION

The present invention provides in one embodiment a process for making a silica masterbatch, which includes the steps of hydrophobating silica; receiving a solution-made rubber; making a polymer latex; mixing the hydrophobated silica and the solution-made rubber into the polymer latex; coagulating the polymer latex; and recovering a silica-filled rubber that comprises a mixture of silica, emulsion-made rubber and solution-made rubber. The silica is preferably hydrophobated by dissolving a trimethoxy silane coupling agent in a mixture of alcohol, a weak acid and water to provide a trimethoxy silane coupling agent solution that contains at least about 75% water by weight, and mixing the trimethoxy silane coupling agent solution with silica and adding a base to increase the pH to form the hydrophobated silica. The trimethoxy silane coupling agent is preferably 3-mercaptopropyl trimethoxy silane, bis-(3-trimethoxysilyl-propyl)-disulfide and/or bis-(3-trimethoxysilylpropyl)-tetrasulfide. The solution-made rubber is preferably received in the form of rubber particles suspended in water or as a wet crumb.

The present invention provides in another embodiment a process for making a silica masterbatch, which includes the steps of making, obtaining or preparing a solution-made rubber stream having from about 5% to about 50%, preferably from about 10% to about 25%, solids by weight in an organic solvent; receiving a suspension of emulsion-made rubber particles in water, wherein the emulsion-made rubber particles contain silica dispersed within the particles; feeding the solution-made rubber stream and the suspension of emulsion-made rubber particles to a steam distillation unit; operating the steam distillation unit; and recovering a silica-filled rubber that comprises solution-made rubber, emulsion-made rubber and silica. A dispersant and a coagulant are preferably added into the steam distillation unit and are preferably added into the suspension of emulsion-made rubber particles in water.

In a further embodiment the present invention provides a process for making a silica masterbatch that comprises a solution-made rubber and silica, without an emulsion-made rubber. The process includes the steps of hydrophobating silica and mixing it into a process oil; making a solution rubber in an organic solvent; flashing off the solvent to make a solution rubber stream; feeding the solution rubber stream to a steam distillation unit; feeding the mixture of hydrophobated silica and process oil to the steam distillation unit; and recovering a silica-filled rubber that comprises the solution rubber and the hydrophobated silica without any emulsion-made rubber. The process preferably further includes feeding a dispersant and a coagulant to the steam distillation unit; and dewatering; homogenizing, drying and baling the silica-filled rubber. The silica-filled solution-made rubber can be mixed into a polymer latex at an emulsion rubber plant in another embodiment of the invention. A process oil is preferably also mixed into the polymer latex, followed by mixing a coagulating agent, preferably an aluminum, calcium or magnesium salt, into the polymer latex, after which a silica masterbatch is recovered that comprises solution-made rubber, emulsion-made rubber and silica, which preferably also includes process oil.

BRIEF DESCRIPTION OF THE INVENTION

The present invention provides processes for making a silica masterbatch. In one embodiment, solution rubber is made into very small crumbs (less than or equal to 3 mm) via steam distillation. The crumbs are washed and kept wet. Silica is hydrophobated. Emulsion rubber is made up to a latex stage. The hydrophobated silica, wet solution rubber crumb and a process oil are mixed into the latex followed by coagulation. A silica-filled rubber that comprises the solution rubber, the emulsion rubber and the hydrophobated silica is recovered, dewatered, homogenized if desired, dried and baled. In another embodiment, a latex of emulsion rubber is made, and silica is hydrophobated and, along with process oil, mixed into the latex. The latex mixture is coagulated, and a silica-and-emulsion rubber is recovered and diluted with water to form a slurry having a desired concentration. A solution rubber is made up to a steam distillation step. The silica-and-emulsion rubber is preferably heated and then, along with a process oil, added into a steam distillation unit in the steam distillation step. A dispersant and a coagulant are also preferably added into the steam distillation unit. A silica-filled rubber that comprises the solution rubber, the emulsion rubber and the hydrophobated silica is recovered, dewatered, homogenized if desired, dried and baled. In another embodiment, a silica masterbatch of solution rubber is made without emulsion rubber. Silica is hydrophobated and mixed with a process oil. A solution rubber is made up to a steam distillation step. The silica-and-process-oil mixture is preferably heated and then added into a steam distillation unit in the steam distillation step. The solution polymer is steam distilled in situ in the presence of the silica-and-process-oil mixture. Some or most of the solution polymer bonds or sticks to the surface of the silica. A dispersant and a coagulant are also preferably added into the steam distillation unit. A silica-filled rubber that comprises the solution rubber and the hydrophobated silica is recovered, dewatered, homogenized if desired, dried and baled. In a further embodiment, the silica-filled solution-made rubber is recovered, but not dried or baled and preferably without an extender oil, and mixed into a polymer latex at an emulsion plant, preferably with a process oil. The latex mixture is coagulated, and a silica masterbatch is recovered that comprises solution-made rubber, silica and emulsion-made rubber.

In one embodiment of the present invention, a slurry of silica in water containing typically at least about 75% water is treated with a methoxy silane, or a mixture of methoxy silanes, to make a hydrophobated silica. Suitable methoxy silane compounds include bis-(3-trimethoxysilylpropyl)-disulfide, bis-(3-trimethoxy-silylpropyl)-tetrasulfide and 3-mercaptopropyl trimethoxy silane. The hydrophobated silica is combined with a latex made in an emulsion rubber process, a rubber made in a solution rubber process, and, optionally, with other compounding ingredients such as processing oils to form a latex mixture. The latex mixture is coagulated to form a crumb rubber that comprises rubber made by the emulsion process, rubber made by the solution process and hydrophobated silica. Conventional coagulation agents can be used, but a calcium salt, particularly calcium chloride, is a preferred coagulation agent. The crumb rubber is preferably dewatered and preferably dried to form a silica-filled-rubber masterbatch, which is referred to as a silica masterbatch. The silica masterbatch can be baled and transported to a manufacturer, who makes rubber products, mixing the silica masterbatch with, optionally, non-silica-filled rubber and with other ingredients used in rubber compounding and vulcanized to make final rubber products, especially tires.

One aspect of this invention is hydrophobation of silica with a water soluble or water/alcohol soluble silane or silane reaction product, where the water/alcohol mixture (or water/alcohol/acid mixture) contains at least about 75% water, and where the soluble silane or silane reaction product is capable of hydrophobating silica. In addition to 3-mercaptopropyl trimethoxy silane, methoxy substituted silanes with the structure shown below as Formula 1 have been found to successfully hydrophobate the silica in a wet process for silica masterbatch;

$[(CH_3O)_3Si\text{-}(Alk)_m\text{-}(Ar)_p]_q[B]$          Formula 1 where
B is —SCN, R—C(=O)S, (if q=1) or $S_x$ (if q=2);
Alk is a straight chained or branched bivalent hydrocarbon radical;
R is an alkyl group containing 1 to 18 carbons;
m is 0 or 1; p is 0 or 1; m+p=1; q=1 or 2;
Ar is an arylene radical having from 6 to 12 carbon atoms; and
X is a number from 2 to 8; and
where the silane or its reaction product with water is substantially soluble in alcohol/water mixtures containing at least about 75 wt % water. The alcohol/water mixture preferably includes a small amount of a weak acid such as acetic acid or oxalic acid.

One object of the present invention is to provide a silica masterbatch that is excellent in balancing wet skid, hysteresis loss, abrasion resistance and mechanical strength, which makes the silica masterbatch useful as a material for rubber products, particularly tire treads. The silica masterbatch of the present invention includes rubber made from both the emulsion process and the solution process in a homogeneous mixture with silica dispersed evenly throughout the mixture. The silica masterbatch of the present invention can include components that are difficult to process in a tire manufacturing plant, such as polybutadiene due to its softness.

The present invention provides in one embodiment a process for the preparation of silica masterbatch using an aqueous process where solution rubbers and emulsion rubbers are mixed with fully hydrophobated silica. The resulting compound has similar properties compared to a dry mix compound, where the silica is hydrophobated typically in a mixer. This wet process can mix one or a few types of solution rubbers with hydrophobated silica aided by other compounding ingredients such as processing oils, during a coagulation process with emulsion rubbers. The resulting masterbatch has a significant amount of solution rubbers typically used in high performance tires, and has fully-dispersed, fully-hydrophobated silica throughout the matrix. This wet process has such a flexibility that some known difficult-to-process solution rubbers, such as SSBR with very high molecular weight, can be easily incorporated into the system and perform well in rubber compounding. This wet process also has flexibility for incorporating difficult-to-mix silica, such as silica with a BET surface area of over 175 m²/g, due to the aqueous process conditions.

In one embodiment, concentrated solution rubber in solvent is steam-distilled, forming a rubber crumb in water. The size of the rubber crumbs is controlled typically by the addition of dispersants used in a typical industrial process. The wet rubber crumb is dewatered and washed to remove dispersants and coagulants and then used directly in a process for making silica masterbatch according to the present invention. Multiple types of rubber crumb can be prepared separately and fed into the silica-masterbatch process simultaneously and/or sequentially.

In another embodiment, already-dried solution rubber products may be dissolved in a suitable solvent, preferably low boiling point solvent, and then steam-distilled to form crumbs-in-water, which can be used directly in the silica-masterbatch process.

In one embodiment, performance enhancers, processing aids, or other additives can be added during the steam-distillation of solution rubbers. In another embodiment, these additives can be added during the hydrophobation and/or coagulation stage for production of masterbatch variants. Carbon black can be added to make a silica-carbon-black masterbatch, but carbon black is not required in a process for making silica masterbatch according to the present invention. Carbon black is an optional additive that can be incorporated into the silica masterbatch of the present invention, preferably by including carbon black in a latex emulsion prior to coagulation, but the process for making silica masterbatch according to the present invention does not require carbon black.

In one embodiment, a slurry of silica in water, or in a solution of water and an organic solvent containing at least about 75% water, is treated with a methoxy silane, or a mixture of methoxy silanes, and preferably a weak acid, to give a hydrophobated silica. The hydrophobated silica is combined with a latex, and optionally with other compounding ingredients such as processing oils, prior to coagulation of the latex. Solution rubber crumb is also added into and mixed thoroughly with the latex, making a mixture of hydrophobated silica, solution rubber and latex, which may be referred to as a latex mixture. After the additions have been made to the latex and mixed thoroughly into the latex, the latex mixture is coagulated and homogenized to a uniform mix and subsequently dried.

In another embodiment of the present invention, hydrophobated silica is mixed into a latex, without the addition of a solution rubber. The mixture of latex and silica is coagulated to form a silica-emulsion-rubber crumb. In a process for making solution rubber, which includes a steam distillation step in which solution rubber crumb is formed, the silica-emulsion-rubber crumb is added to the distillation step and mixed with the solution rubber crumb to form a mixture of a solution-made rubber, an emulsion-made rubber and hydrophobated silica. The mixture is filtered, homogenized, and dried to form a masterbatch that includes the solution-made rubber, the emulsion-made rubber and the hydrophobated silica in a homogeneous mixture.

Other embodiments and advantages of the present invention will become apparent to those skilled in the art upon a review of the following detailed description of exemplary embodiments of the invention.

DETAILED DESCRIPTION OF THE INVENTION

The present invention provides in one embodiment a process for making a silica masterbatch in aqueous coagulation of emulsion SBR, processing oil/other additives, and fine solution rubber crumbs/particles made in a steam distillation step in a conventional process used for making solution rubber. The invention provides in another embodiment a process for making the silica masterbatch in situ during the steam distillation step, where a silica-emulsion rubber mixture is added as solution rubber crumb is formed to make a mixture of hydrophobated silica, emulsion-made rubber and solution-made rubber in water, which is separated from the water, homogenized and dried to form a silica masterbatch according to the present invention. In this embodiment, the solution rubber may adhere to suspended hydrophobated silica or, preferably, to a coagulated body from the emulsion process that includes emulsion rubber, hydrophobated silica and additives, such as processing oil, to form a masterbatch with uniformly dispersed ingredients throughout the matrix.

One embodiment of the present invention provides a method in which a solution rubber is dissolved in a solvent first, followed by a coagulation process via steam distillation, and making a silica masterbatch by coagulating the solution rubber together with a hydrophobated silica in an emulsion latex, which preferably includes a processing oil. The solution rubber is preferably prepared at 10-25 wt %, which mimics industrial conditions. During the distillation, dispersants, which usually are hydrophobic polymers functionalized by hydrophilic groups, are added and coagulants, such as calcium chloride, are also added. The size of the crumb will depend on the amount of the dispersants and the coagulants, as well as the temperature, agitation speed, and feed rate. The crumb size is preferably kept small enough so that the solution rubber crumb can be dispersed uniformly later in an emulsion latex. The crumbs are filtered and washed with water to remove some of the residual dispersants and coagulants and are kept in a wet condition for further steps. The wet condition should be maintained during the whole time, because failure to do so may result in the crumbs fusing together and forming a larger size or even consolidating into large chunks.

In a separate step, silica is hydrophobated in a wet process where silane is added and the solution is heated so that the silanalization reaction can happen. The silanol groups on the silica surface react with the silane, and this changes the hydrophobicity of the silica, which makes the silica compatible with the rubber. The hydrophobated silica is added to an emulsion latex, typically an emulsion SBR. A processing oil is typically added, and the mixture is homogenized by stirring. Solution rubber crumb is added to the mixture, which is further homogenized by stirring. The homogenized mixture is coagulated, preferably with a calcium salt, forming a rubber crumb that includes solution-made rubber, emulsion-made rubber and hydrophobated silica. Phase separation can occur if the particle size of the solution-rubber crumb is substantially larger than the particle size of the emulsion-rubber crumb that would be formed in the absence of the solution-rubber crumb. If phase separation occurs, the solution-rubber crumb can be homogenized with the rest of the ingredients after the dewatering step, where the material forms a "wet cake" and is further broken down into wet chunks for drying. The average particle size of the solution-rubber crumb is less than or equal to 3 mm, preferably less than or equal to 2 mm and more preferably less than or equal to 1.5 mm, while less than or equal to 1 mm is more desirable.

In another embodiment, a similar method is described where the sequence of preparing the masterbatch is in a different or reversed order. The silica is hydrophobated first in a wet process where silane is added and the solution is heated so that the silanalization reaction can happen. The hydrophobated silica is added into an emulsion latex, particularly emulsion SBR, preferably along with a processing oil, and the mixture is homogenized by stirring and coagulated into crumbs. The crumbs are kept in an aqueous phase and are diluted with water to a desired solids level to provide particles of an emulsion-rubber-and-silica crumb suspended in an aqueous solution. A solution rubber is made in a conventional process up to the point of a steam distillation step. The aqueous solution that contains the particles of emulsion-rubber-and-silica crumb is heated to a desired temperature and added into the steam distillation step in the process for making the solution rubber. The steam distillation step is performed, and during the distillation, the solvent evaporates, and the solution rubber forms a coating on the particles of emulsion-rubber-and-silica crumb, which forms larger particles of a solution-rubber-and-emulsion-rubber-and-silica crumb. After the distillation, the inventive crumb is filtered, washed and dried.

Silica

Silica for the present invention can include pyrogenic and precipitated siliceous fillers, although precipitated silicas are preferred. The siliceous fillers preferably employed in this invention are precipitated silicas, such as those obtained by the acidification of a soluble silicate, e.g., sodium silicate. Such silicas might be characterized, for example, by having a BET surface area, as measured by nitrogen gas, in the range of about 40 to about 600 and preferably in the range of from about 50 to about 300 square meters per gram. The BET method for measuring surface area is described in the Journal of the American Chemical Society, volume 60, page 304 (1930). Also important is surface area characterized by CTAB, which more accurately reflects the surface area that a polymer in a compound experiences. Such silicas might have surface areas in the range of from about 40 to about 600 and are preferably in a range of from about 50 to about 300 meters per gram using this test. The CTAB test is described in ASTM D6845-02 (2008). Various commercially available silicas may be used in the practice of this invention. Example silicas include Hi-Sil 190 and 233 from PPG Industries (One PPG Place, Pittsburgh, Pa., 15272 USA); Z1165MP and Z165 GR from Rhodia (Coeur Defense Tour A-37 eme etage, 110 esplanade Charles de Gaulle, Courbevoje 92931, France); and Ultrasil 7000 from Evonik-Degussa (379 Interpace Parkway, Parsippany, N.J. 07054-0677 USA).

Precipitated silicas that are especially suitable as fillers for passenger vehicle tires typically have the following characteristics:

BET surface area of 100-350 $m^2/g$;
CTAB surface area of 100-350 $m^2/g$; and a
Ratio of BET/CTAB of 0.8-1.3.

High surface area (HSA) silicas, as defined in this invention, are silicas having a BET surface area of at least 200 $m^2/g$, preferably greater than 220 $m^2/g$. Highly-dispersible grades are highly preferred. Examples are Newsil HD 200MP (BET 200-230, CTAB 195-225, Q&C Company), Newsil HD 250MP (BET 220-270, CTAB 210-265, Q&C Company), Zeosil Premium (BET 215, CTAB 200, Rhodia). High surface area silicas can be more effective for reducing the rolling resistance and improving the wear of a tire compared to the low surface area of conventional or highly dispersible silicas. They are not typically used for winter tires or snow tires. Typically, high surface area silicas have poor processability in dry mixing, and the processability becomes progressively worse with higher and higher surface area.

Precipitated silica is manufactured by treating sodium silicate with an acid such as sulfuric acid in a chemical reactor. The resulting crude silica is filtered and washed to remove the sodium sulfate byproduct, forming the wet-cake silica. Conventionally, the wet-cake silica was dried in a spray drier and in a mill polish drier, after which it was packaged and transported for use as a dry particulate matter. The processing of silica after the wet-cake is made is a significant cost factor in making conventional dry silica product. One aspect of the present invention is the use of the wet-cake silica directly, eliminating the expense of drying and packaging the silica. This silica can be isolated prior to drying and compaction and has the advantage of being easier to disperse in the rubber.

Compared to dry mixing silica into rubber, the present invention can utilize the full potential of silica that has a high surface area. In a dry mix, rubber compounds become more and more difficult to process with the increase of surface area of silica and become almost unprocessable for silica with very high surface area. In the wet process, the surface area of the silica does not matter much, and for silicas with very high surface area, the process can proceed normally without significant adjustment. The silica BET surface area can be from 20-400 $m^2/g$, preferably 100-200 $m^2/g$. Synthetic silica via precipitation methods is highly preferred in the process. Other naturally occurring or synthetic silica via other methods can be used for specific applications. Although it is possible to make a masterbatch with unhydrophobated silica using this invention, it is highly desirable to hydrophobate the silica first.

Process for Hydrophobating Silica

Silica is hydrophobated to make the inorganic silica compatible with an organic rubber matrix. Hydrophobation is a compatibilization process. A silane is used in the present invention to treat the silica and make it compatible with rubber, and a methoxy silane is preferred. The treatment of the silica with a silane should attach the silane to the silica and make the silica more compatible with the rubber, which is the process of hydrophobating the silica, and once attached to the silica, the silane should have properties or a chemical structure that makes it capable of interacting with the cure system of the rubber to bond the rubber to the silica during cure. Trimethoxy silanes are preferred for hydrophobating silica in a wet process according to the present invention, including methoxy substituted silanes with the structure shown above as Formula 1 and 3-mercaptopropyl trimethoxy silane. Preferred trimethoxy silane compounds include bis-(3-trimethoxysilylpropyl)-disulfide, bis-(3-trimethoxy-silylpropyl)-tetrasulfide and 3-mercaptopropyl trimethoxy silane.

The silica is hydrophobated by mixing a trimethoxy silane coupling agent with water, alcohol and a small amount of a weak acid to initially lower the pH of the solution. Silica is mixed into the solution, and the pH is increased. The mixture of water, acid and alcohol preferably contains at least about 75% water by weight. The procedure for hydrophobating silica is a two-step procedure in which: (i) the trimethoxy silane coupling agent is dissolved in a mixture of alcohol, acid and water for promoting hydrolysis of the trimethoxy silane coupling agent for preparing the trimethoxy silane coupling agent for a condensation reaction, which forms a hydrolyzed trimethoxy silane coupling agent solution; and (ii) the hydrolyzed trimethoxy silane coupling agent solution is mixed with silica, and a base is added to increase the pH for promoting the condensation reaction for bonding the trimethoxy silane coupling agent to the silica to form the hydrophobated silica.

In practicing the present invention, a wet-cake silica is preferably hydrophobated before it is added to the rubber-making process. The silica is treated with a silane coupling agent, which is dissolved in an aqueous alcohol solution. In the first step of the process, a methoxy silane coupling agent is dissolved in approximately an equal volume of alcohol with a catalytic amount of a weak acid, preferably acetic acid. Carbonic acid and oxalic acid are also weak acids. A trimethoxy silane is preferably used, and the pH is acidic, but above about 2.5, preferably between about 3 and about 6, more preferably between about 3.5 and about 5.0. A target pH between about 3.5 and about 4.5 may be satisfactory. Secondly, water is slowly added to the solution over a 15-60 minute period to provide a final alcohol/water ratio of no more than about 25% so as to minimize the need to recycle or dispose of the alcohol. Preferably at the end of the water addition, the alcohol content is less than 10% of the solvent system, and more preferably, the alcohol is less than 5% of the solvent system. The amount of weak acid in the solvent system is small, typically less than about 5%, preferably less than 2% by weight; and the amount of alcohol in the mixture of alcohol, acid and water is generally less than 25%, preferably less than 10% and more preferably less than 5% by weight. Weak acids include acetic, carbonic, formic, oxalic, trichloroacetic, hydrofluoric and hydrocyanic acid.

As previously stated, the trimethoxy silane coupling agent, which preferably includes sulfur for vulcanization of rubber, is dissolved in a mixture of water, alcohol and a weak acid solution, and the mixture comprises more than 70% water, less than 30% alcohol and less than 10% weak acid solution by weight. The mixture preferably comprises more than 75% water, less than 25% alcohol and less than 7% weak acid solution. The mixture more preferably comprises more than 80% water, less than 20% alcohol and less than 5% weak acid solution by weight. In one embodiment, the mixture comprises more than 90% water, less than 10% alcohol and less than 3% weak acid solution by weight. In a preferred embodiment, the mixture comprises more than 95% water, less than 5% alcohol and less than 1% weak acid solution by weight, preferably acetic acid.

During the addition of water, the mixture may become cloudy, but this clears up as the hydrolysis proceeds. After the addition of water is complete, the solution is agitated to ensure complete hydrolysis, typically for less than an hour and preferably for about 30 minutes or so. The amount of trimethoxy silane coupling agent made in the hydrolysis step is calculated so as to match the amount of silica being hydrophobated. The amount of coupling agent is usually indicated as a weight percent of silica used and will depend on the individual silane and silica surface area, but will be preferably from about 2% to about 10 wt %, and more preferably from about 4% to about 8 wt % of the silane compound relative to the silica.

The silica to be hydrophobated is preferably in a slurry form with a suitable viscosity so that it can be agitated easily. The silica concentration is preferably between 1% and 25%, more preferably between 4% and 15% and most preferably between 6% and 10%. The silica slurry and solution of hydrolyzed coupling agent are mixed together and stirred, preferably for about 30 minutes. The pH of the mixture is then increased by adding a base. Sodium hydroxide is a preferred base, but other bases that may be suitable include potassium hydroxide, calcium hydroxide, barium hydroxide, cesium hydroxide, strontium hydroxide, lithium hydroxide and/or rubidium hydroxide. It may be possible to neutralize the solution with ammonia, alanine, methylamine, dimethylamine, trimethylamine, ethylamine, glycine and/or hydrazine. With the addition of a base, the pH of the mixture is preferably raised to an approximately neutral pH, preferably between about 6.5 and 8.5, more preferably between about 7 and about 8, with a pH of about 7.5 being a good target value. The mixture is heated to greater than about 140° F. and is preferably held at about 160° F. for several hours, preferably about three hours, to provide a hydrophobated silica in slurry form. The silica will typically be hydrophobated at the rubber plant. At the rubber plant, after the silica is hydrophobated, it is fed into a tank, mixed into a rubber latex solution for dispersion, and incorporated into the rubber during coagulation.

A large number of silanes are suitable for the hydrophobation process, although silanes that contain sulfur are highly preferred for their coupling effect with rubber. Examples of preferred silanes are bis-(3-trimethoxysilylpropyl)-disulfide (TMSPD), bis-(3-trimethoxysilylpropyl)-tetrasulfide (TMSPT), 3-mercaptopropyl trimethoxy silane, and their derivatives of ethoxysilanes and chlorosilanes. Although not preferred, other types of silanes, including aliphatic or aromatic silanes, amino silanes, epoxidized silanes, and other functionalized silanes may be used in the process for specific properties. When using different silanes, care should be taken to adjust the sulfur content from different silanes in order to obtain similar cure response in rubber mixing. The typical amount of silane applied is between 3 phr to 12 phr, preferably 5-8 phr in the final compound.

Process for Making Silica Masterbatch with Emulsion Rubber

U.S. Pat. No. 8,357,733, issued to Wallen et al., discloses a process for hydrophobating silica and an emulsion process for making a silica-filled-rubber masterbatch using rubber made in an emulsion process. The U.S. Pat. No. 8,357,733, issued to Wallen et al., is incorporated by reference so that all or portions of the patent can be used in the description of the present invention. U.S. Pat. No. 6,646,028, issued to Lopez-Serrano Ramos et al., describes an emulsion process for making rubber and incorporating carbon black to make a carbon black masterbatch and is incorporated by reference for its description of a process for making rubber in an emulsion plant. In the process for making rubber, various monomers can be used. In one embodiment of the present invention, styrene and butadiene monomers are mixed together in water in a wet or emulsion process, and additives including a modifier, an emulsifier and an activator are added to the solution to form a feed stream. The feed stream is fed to a heat exchanger that removes heat from the feed stream. An initiator is added, and the feed stream with the initiator flows through a series of stirred reactors. Polymerization occurs as the material flows through the reactors and continues as long as styrene and butadiene monomer units are available in the solution. To stop the polymerization at a desired polymer chain length, a short-stopping agent, such as hydroquinone, is added. The reactor product stream flows into a blowdown tank, and steam is added to strip out styrene and butadiene monomer. Flash tanks and stripping columns can be used to further remove any residual monomer, forming a stripped, aqueous latex stream, which flows into latex storage tanks.

The silica and latex can be brought together in either a batch or continuous process. In the continuous process, streams of the latex and the hydrophobated silica are blended together in a pipe and the flow rates of the silica slurry and latex are controlled in such a manner that the desired ratio of silica to rubber is obtained in the final coagulated rubber. Conventional static mixers can be used in the pipe to achieve mixing. By the time the pipe empties into the coagulation vessel, the hydrophobated silica and latex have been fully mixed. In the batch process, a measured amount of latex of known rubber content is charged to an agitated vessel and the silica slurry is fed into the vessel and allowed to mix until the silica is adequately dispersed in the latex. In either process the rubber to silica ratio will be greater than 0.3/1.0 and will preferably be between 10/1 and 1/1 and more preferably between 4.0/1.0 and 1.25/1.0. The amount of silica in the final compound where the masterbatch is used can vary widely. For tire compounds, this may vary between 10 parts per hundred rubber and 90 parts per hundred rubber. The amount of silica added to the latex emulsion should be determined by end-use requirements.

A coagulation agent is added to coagulate the latex to form rubber crumb in an aqueous serum. Typically, the concentration of coagulant aid in the serum is less than about 200 or so parts per million (ppm). Typical coagulating agents include sulfuric and hydrochloric acid, sodium chloride and aluminum sulfate, depending on the rubber that is made. Possible coagulants include calcium chloride, ferric chloride, zinc chloride, salts of aluminum such as aluminum sulfate, salts of magnesium such as magnesium sulfate, sulfuric acid, citric acid and isopropanol, as well as other inorganic or organic types of coagulants. The preferred coagulating agent is a calcium salt, preferably calcium chloride. The U.S. Pat. No. 8,357,733, issued to Wallen et al., discloses that coagulation is an important aspect in the successful preparation of a silica rubber masterbatch made in an emulsion rubber process. Calcium chloride coagulant is added to a latex emulsion to provide a concentration in the recovered latex of less than about 5 wt %, preferably less than about 2.5 wt %, more preferably less than about 1.0 wt %, and most preferably between about 0.2 and about 0.8 wt %. Adding an amount of calcium chloride to yield a concentration of about 0.6 wt % calcium chloride in the latex works well to coagulate the rubber latex.

A rubber product is formed in the coagulation tank as the latex coagulates to form rubber and incorporates the silica in its matrix during rubber crumb formation. The product consists of a highly dispersed silica in a rubber matrix. Any method that effectively dewaters the coagulated product can be used. In a laboratory, the crumb can be simply filtered and pressed dry. In a production operation, examples of suitable dewatering units include a French Oil Machine, a chamber filter press and an inverting filter centrifuge. The filter press and centrifuge are preferred. The latter two are described in U.S. Pat. No. 6,878,759 for use with silica masterbatch. Any known method for drying the dewatered masterbatch to a level of moisture below about 3% can be used. In the laboratory this can be accomplished with a forced air oven. In a production environment, a tunnel drier or fluid bed drier can be used.

Any rubber, elastomer or polymer that can be made into an aqueous dispersion can be used in this invention. It is also possible to use blends of rubbers in this invention. The polymer is preferably selected from the group consisting of styrene-butadiene rubber, natural rubber, acrylonitrile butadiene rubber, neoprene rubber, polybutadiene rubber, vinyl pyridine butadiene rubber and styrene butadiene termonomer rubber, where the termonomer is chosen from the group consisting of hydroxyalkyl acrylate, vinyl pyridine and acrylonitrile. The styrene butadiene termonomer rubbers are more fully described in a paper by Georges Thielen entitled "Chemically Modified Emulsion SBR's In Tire Treads," which was presented at the 172nd Technical Meeting of the Rubber Division of the American Chemical Society.

Optional ingredients that can be included with the silica and latex include such materials as processing oils, other fillers such as carbon black, talc or clay, stabilizers such as 6-PPD or other antidegradants, zinc salts, waxes, resins, or crosslinking chemicals. Any material necessary for further compounding, which does not interfere with the coagulation and other downstream processes, can be included. Carbon black can be added into the latex emulsion and can be incorporated into the masterbatch that is recovered, but carbon black is not required for any aspect of the process for making a satisfactory silica masterbatch according to the present invention.

Solution Rubber

In a typical solution SBR process, monomers of styrene and butadiene are dissolved in an organic solvent such as cyclohexane or a mixture of hexane isomers. Polymerization is initiated with alkyl lithium initiators, which have the formula R(Li)1-4. Typical R groups are alkyl, cycloalkyl, cycloalkylalkyl, alkylcycloalkyl, aryl and alkylaryl radicals. Randomization agents are typically added to randomize the styrene and butadiene due to different reaction rates. Various ways may be applied to create polymers with defined microstructure. In addition, the polymer may be functionalized at the chain-end or in-chain via in-situ modification or via post-polymerization steps to obtain a material that offers a strong interaction with silica. For high performance tires, it is a desirable to have high molecular weight, high vinyl, and, optionally, functionalized grades in tire building due to their balanced properties in wet traction and rolling resistance.

Once polymerized, a polymer solution containing typically 10-15 wt % solids is flash-distilled in order to increase the concentration to 20-25 wt % and to remove any trace amount of unreacted monomers. The solution is then steam-distilled and coagulated to form crumbs. In this process, the polymer solution is fed to hot water or steam and an azeotrope of water and cyclohexane is distilled out at a temperatures around 70° C. under atmospheric pressure. Typically one or several types of dispersants and coagulants may be used to control the crumb size. In normal operation large rubber crumbs are usually preferred as it is easier to filter. However, for this invention it is preferred to use a larger amount of dispersants which will result in smaller crumbs. The smaller crumbs are advantageous as it will be easier to mix with the latex and other ingredients. The crumb size is also influenced by the coagulants that are fed into the system during the distillation. Other parameters, such as the pH value, temperature, different types of coagulants and dispersants, will also contribute to the size control of the crumbs.

It was discovered in the present invention that the size of crumb rubber particles made in a conventional solution rubber plant, which is about 4-5 mm, is too large for incorporating into latex at an emulsion rubber plant because phase separation occurs after coagulation. It was further discovered that operation of a solution rubber plant can be changed to yield a crumb rubber particle size of about 1-2 mm, which yields a satisfactory silica masterbatch when introduced into the latex at the emulsion rubber plant, without phase separation. The changes at the solution rubber plant for making the smaller particle size include lowering the throughput in the finishing area of the solution rubber plant, particularly the feed rate to the steam distillation unit, and increasing the amount of dispersant fed to the steam distillation unit above the conventional amount.

The solution-made rubber slurry is typically subjected to further steam stripping to remove any residual solvent to be at least less than 5%. The crumbs will be filtered and the wet crumbs can then be transported to the emulsion plant for the production of silica masterbatch. An alternative is to transport the slurry directly to the emulsion plant without filtration. The water in the slurry is not an issue for this invention, as the final masterbatch production is a water-based process. Care should be taken to monitor the water content of the wet crumbs or slurry to ensure an optimum composition of the final silica masterbatch.

The present invention provides considerable freedom on choosing and applying different types of solution rubber. In particular, solution SBRs are highly suitable for the process. Examples of SSBRs are low vinyl grades, high vinyl grades, low MW grades, high MW grades, ultra high MW grades, end-chain functionalized grades, in-chain functionalized grades, linear or branched grades, and various combinations of two or several listed traits. Oil-extended or clear grades are both suitable, although clear grades are preferred for inclusion in the emulsion process so that the cost of extender oil at the solution plant is avoided. Polybutadiene rubber that is synthesized via different catalyst systems (neodymium, titanium, cobalt, lithium, nickel) is also suitable for the process. Neodymium polybutadiene s particularly beneficial through this process because many of the grades are considered difficult to mix in a dry-mix process, largely due to its high cis structure. Polyisoprene is also suitable. Desirable properties may be obtainable by adding or replacing part of the solution rubbers with thermoplastic types of elastomers. Examples are SBS block copolymers, SB random copolymers, EPDM, chloroprene, polyurethane and various other thermoplastic elastomers.

Suitable solvents for carrying out the distillations are saturated or unsaturated, aliphatic or aromatic hydrocarbons, chlorinated aliphatic or chlorinated aromatic hydrocarbons, alcohols and ketones. Suitable dispersants in coagulation are polymers with hydrophilic functionalities. Examples are carboxylate polymers, functionalized acrylic polymers, polymers based on fatty acids or rosin acids, synthetic sulfonated polymers, and other polymers with a hydrophilic functionality. Possible coagulants include calcium chloride, ferric chloride, zinc chloride, salts of aluminum such as aluminum sulfate, salts of magnesium such as magnesium sulfate, sulfuric acid, citric acid and isopropanol, as well as other inorganic or organic types of coagulants.

Silica Masterbatch Made in an Emulsion-Rubber Plant

In one embodiment of the present invention rubber previously made in a solution process is added to a latex emulsion, along with silica, and readily forms a uniform mixture with simple agitation. This mixture is then coagulated, and a silica masterbatch is recovered that comprises emulsion-made rubber, solution-made rubber and silica in the form of a wet crumb slurry. The next step of the production separates the crumb solids from the slurry by a dewatering press or mill-type device. The final step is dry the silica masterbatch product in an air dryer and to convey the dry crumb to a baler press. Bales of the silica masterbatch rubber, typically weighing about 50 to 100 lbs, preferably about 80 lbs, are wrapped in a plastic film and boxed or crated for shipment to a tire plant or other consumer of rubber. A silica masterbatch rubber product made according to this embodiment of the present invention is made in an emulsion-rubber-manufacturing plant and is a uniform mixture of emulsion-made rubber, solution-made rubber and silica and is referred to as a silica masterbatch.

Once the wet crumbs or slurry of the solution-made material arrives, the production of silica masterbatch can proceed under normal process conditions similarly as described previously, where the solution-made material, the emulsion latex, hydrophobated silica, process oil, and other ingredients are mixed together to form a uniform mixture. The mixture is then coagulated, filtered, dried and baled to a desired specification.

Solution rubber, preferably in the form of a wet crumb or in an aqueous suspension, is added to the latex in the emulsion rubber plant. Process oil is also added to the latex and mixed in along with the solution rubber. A wide variety of process oils that are commonly used in the tire industry are suitable for the process, which include highly aromatic oil, treated distillate aromatic extract (TDAE), residual aromatic extract (RAE), mildly extracted solvate (MES) and hydroprocessed naphthenic oil (HNO). Paraffinic oil, which is commonly used in the footwear industry, may be used for specific applications. The process oil is used at 10-110 phr, preferably 20-80 phr, more preferably 25-50 or 30-50 phr. Process oil can be an important ingredient in the masterbatch, if particle size of the coagulated rubber is important, such as due to requirements in downstream processing equipment. Phase separation can be avoided by the use of process oil, which helps to adhere the solution-made rubber, the emulsion-made rubber and the silica to each other.

The crumb size of the silica masterbatch after coagulation can be controlled by common factors such as salt concentration, temperature, agitation speed and so on. It is also strongly influenced by the amount and the types of process oil, as process oil is being dispersed throughout the mixture and providing adhesion. In this last process, larger crumb sizes are preferred for easy filtration, although small crumbs can also be separated with ease if the right equipment is applied.

Emulsion SBR is the most preferred type of latex in this invention. The common tire grades, such as E1500 and E1502, are the most suitable. Oil-extended grades, such as E1723, are suitable. Different latexes can be mixed beforehand, provided the mixture is stable in water. The latex used can have different soap packages, which commonly comprise rosin, fatty acid, or synthetic soaps. Solid level of the latex is not critical as the latex will be diluted by the silica suspension. But to obtain consistent results, care should be taken to make the solid level consistent among different batches. Although not applicable in tire building, other synthetic types of latexes, such as acrylic polymers and polyvinyl acetate, can be used. Naturally occurring latexes can be used solo or mixed with emulsion SBR for desirable properties.

Silica Masterbatch Made in a Solution-Rubber Plant

1. Containing Emulsion and Solution Rubber

In another embodiment of the present invention, a silica masterbatch that comprises an emulsion-made rubber and a solution-made rubber can be made in a solution-rubber plant. An emulsion-rubber silica masterbatch is made that comprises an emulsion-made rubber and silica, which does not contain solution-made rubber. The emulsion-rubber silica masterbatch, preferably in the form of a crumb in an aqueous solution, is transported to a solution-rubber-manufacturing plant. The emulsion-rubber silica masterbatch is added to an otherwise conventional process for making rubber using a solution process, and a silica masterbatch is made in the solution-rubber plant that comprises the emulsion-made rubber and solution-made rubber.

A solution-made rubber is made in a process in which monomers, such as styrene and a conjugated diene, are polymerized with specific catalysts in an organic solvent. The polymer formed is precipitated and recovered in a steam distillation step, which removes the organic solvent. The polymer is recovered in the form of particles referred to as a crumb. U.S. Pat. No. 5,679,751, issued to Halasa et al., discloses a process for making rubber using a solution process and is incorporated by reference.

Particles or crumb particles of the emulsion-rubber silica masterbatch are added into the steam distillation/coagulation step of the process for making solution rubber. The solution rubber coats or otherwise mixes with or adheres to the particles or crumb particles of the emulsion-rubber silica masterbatch to form a crumb slurry comprising emulsion-made rubber, solution-made rubber and silica. The recovery process then subjects the mixture to steam-stripping to remove residual solvent to trace levels, and then is filtered, dried and baled to yield a silica masterbatch rubber product that comprises a uniform mixture of emulsion-made rubber, solution-made rubber and silica.

Alternatively, the slurry or crumb particles of the emulsion-rubber silica masterbatch may be added into the steam stripping process after the solution-made rubber crumbs are formed. In this process, the solution-made rubber crumbs are further stripped to remove residual solvent. The added slurry or crumb particles of the emulsion-rubber masterbatch are mixed with the existing solution-made rubber crumbs and the total mixture is processed as normal afterwards.

2. Containing Only Solution Rubber

Another silica masterbatch can be made in a solution rubber plant. In this embodiment, the silica masterbatch comprises solution rubber and hydrophobated silica, but no emulsion rubber. Silica is hydrophobated and mixed into a process oil. A solution rubber is made in an organic solvent. The silica slurry is fed into the steam distillation/coagulation process, where the solvent from the solution rubber is flashed off, and dispersants and coagulants are added to the mixture. Crumb particles of solution rubber and silica are formed in-situ, making a silica-filled solution rubber that comprises the solution-made rubber and the hydrophobated silica, but no emulsion-made rubber. The silica-filled rubber is subjected to steam stripping to remove any residual solvent, dewatered, dried and baled.

This process is advantageous for allowing the flexibility of using various types of silica. Particularly, high-surface-area silica can be used without additional treatments. The silica-filled solution-rubber crumbs can be controlled by the amount of process oil, the types of silica, and the amount of the coagulants and dispersants. The process is compatible with a continuous process and with a batch process, where the composition can be controlled better.

Benefits of Silica Masterbatch

A silica masterbatch made according to the present invention, which comprises solution rubber, emulsion rubber and silica, provides significant advantages in mixing rubber in a rubber-product manufacturing plant, particularly for tire building. The reaction pass of hydrophobating the silica is eliminated, which not only improves the mixing results but also eliminates the alcohol from the hydrophobation process at the rubber-product manufacturing plant. The fully dispersed silica requires less mixing and thus increases efficiency. Better performance from a fully-dispersed silica is also expected. Another important advantage of the process is that any type of silica can be used and mixed efficiently, regardless of the surface area, because the silica is incorporated into the rubber in the wet, emulsion process (or into the solution process). High-surface-area silica can be from difficult to impossible to mix in an industrial setting. A silica masterbatch that includes solution rubber offers a means to greatly improve the mixing. An industrial trend to obtain lower rolling resistance of tires has been observed, which requires many new polymers that have poor processability. The processability of the rubber has limited the applications of some advanced materials. With the present invention, this processability problem is no longer of much concern, as a solution rubber fully incorporated into the masterbatch will surely perform much better in typical mixers. This allows rubber producers to prepare advanced materials for tires with considerable freedom.

Tire and other rubber product manufacturers can custom order a masterbatch having specific combinations of a specific solution rubber, a specific emulsion rubber and a specific silica, possibly including additives such as process oil. A masterbatch can include carbon black, although carbon black would not typically be included in the masterbatch, since carbon black is not required in the process and is generally not available at an emulsion-rubber or at a solution-rubber plant. A masterbatch can include polybutadiene, as it can be difficult to incorporate polybutadiene, which is made in a solution-rubber process, into tires because polybutadiene is very soft. It can be desirable to include polybutadiene because it adds desirable performance properties to a tire. High surface area silica is another example. It is difficult to process high surface area (HSA) silica into rubber using a dry mixing process, but in the present invention, HSA silica can be incorporated into the silica masterbatch of the present invention, which can be more easily mixed into rubber in a tire plant.

EXAMPLES

Example 1. Oil-Extended Solution Styrene-Butadiene Rubber Crumb

Two liters of water were added into a 5-liter stirring reactor. Dispersing agent (500 ppm, Tamol 731A, Dow Chemical) and calcium chloride (500 ppm) were added, and the reactor was heated to >70 degrees Celsius. An organic solution of solution SBR (Buna 5025, 400 grams) at 10-25 wt % solids level, preferably 15-20 wt %, in cyclohexane was gradually fed into the reactor. It is highly preferable to preheat the SBR solution to be higher than room temperature in order to reduce the viscosity. The typical temperature is between 30° C.-40° C. During the whole time, the reactor was vigorous stirred, and the cyclohexane was instantly distilled off together with water (92:8 weight ratio), and crumbs were formed. Alternatively, a stream of dispersants and coagulants (50-200 ppm of each components, preferably 100-200 ppm) water solution can be fed into the reactor gradually at the same time with solution SBR (Buna 5025) in cyclohexane at 10-25 wt % solid level from a separate inlet of the reactor. The total amount of solids collected from an experimental batch was close to be 400 grams, a yield close to 100%. The final size of the crumbs was around 1-2 mm in diameter under a microscope. The size was strongly influenced by the feed rate and the agitation speed. The feed rate in a laboratory setting is preferred to be lower than 50 grams per minute to better accommodate the limited temperature control capacity for lab equipment. The agitation speed is preferred to be higher than 200 RPM, preferably higher than 400 RPM. A mixing baffle is highly preferred for better controlling the size of the crumb. The crumbs were filtered from the suspension at the end of the reaction and washed with clean water at least twice for several minutes. The wet crumbs were directly used in the next step after water content was measured.

Example 2. Clear Solution Styrene-Butadiene Rubber Crumbs

Clear types of solution SBR were made into similar sized crumbs via the process described in Example 1. The clear grades used were Buna 4525 and Buna 4526. In this application clear types of solution SBR are preferred to be produced in a commercial process. This simplifies the total SMB process as process oil can be added later after the hydrophobation process of silica.

Example 3. Neodymium Polybutadiene Rubber Crumbs

Neodymium polybutadiene rubber was made into similar sized crumbs via the process described in Example 1. The clear grade used was Buna CB24. Due to its increased solution viscosity in cyclohexane, a reduced solid level of 10-20%, preferably 15-20%, may be used after being heated to a preferable temperature of 30-40° C.

Example 4. Preparation of Silica Masterbatch with a Low Vinyl, Clear Grade Rubber A. Preparation of Hydrophobated Silica Slurry.

An aqueous solution of silane was prepared by charging to a vessel 4 grams of isopropanol, 2.36 grams of 3-mercaptopropyl trimethoxysilane, and 0.7 grams of acetic acid. The mixture was then stirred vigorously at room temperature while 96 grams of water was slowly added. The mixture was then stirred for a further 15 minutes until the solution cleared. Alternatively, ethanol may be used in place of isopropanol to achieve similar results. The amount of 3-mercaptopropyl trimethoxysilane should be adjusted and calculated based on the molar ratio to satisfy the requirements of total sulfur content in the final tire compound. As one of the most commonly used weak acids, acetic acid is preferred for adjusting the pH value to be preferably about 3.5 to about 5.

In a separate vessel equipped with a stirrer, 196 grams of silica cake (20% solids with the remainder being water) and 331 grams of water were charged. The mixture was then stirred for 15 minutes to ensure the cake was completely dispersed. Then the aqueous silane solution was added and stirred for a further 30 minutes. Using a 25% NaOH solution, the pH of the mixture was increased to 7.5. The mixture was then heated to approximately 70° C. for 4 hours while continuously mixing.

B. Preparation of Silica Masterbatch with Solution Rubber Crumbs.

In a vessel equipped with a stirrer, 162.8 grams of latex containing 21.5 wt % 1500 emulsion SBR was charged, along with 26.25 grams of TDAE oil and 0.28 grams of antioxidant. The mixture was then heated to 50° C. while stirring. The hydrophobated silica slurry (40 grams dry) was then added to the hot latex mixture. Solution rubber 4525-0 prepared as shown in Example 2 (35 grams dry weight) was also added. The latex/silica slurry mixture was then maintained at 50° C. for a further 30 minutes while being vigorously stirred. A 0.6% solution of calcium chloride was then added to the mixture to coagulate the latex. The crumb was then dewatered using a cheese cloth strainer. The dewatered product was then dried for 4 hours at 120° C.

C. Compounding with Masterbatch.

140 grams of silica masterbatch was mixed in a Brabender internal mixer. Temperature in the chamber was set at 50° C., and the drop temperature was 160° C. The composition of the silica masterbatch is given in Table 1. The amount of silica used is shown on a dry-weight basis. In table 2, the amount of curatives used for the indicated amount of silica masterbatch is listed. The curatives were added in the mixer, and the resulting compound was rolled into a cylinder on the mill. The cylinder was turned 90° and fed back through the mill nip. The cylinder was put through the mill 5 times to complete the mixing.

TABLE 1

Recipe of the silica masterbatch.

| SMB | phr |
|---|---|
| E1500 | 50.00 |
| Buna 4525 | 50.00 |
| Ultrasil 7000 | 57.14 |
| TDAE oil | 37.50 |
| Silane A189 | 4.57 |
| AO | 0.40 |
| Total | 199.61 |

TABLE 2

Compounding recipe of the masterbatch and a dry-mix compound.

| | SMB | |
|---|---|---|
| SMB | 139.89 | |
| E1500 | 35.00 | |
| Buna 4525 | 35.00 | |
| CB 24 | 30.00 | 30.00 |
| Ultrasil 7000 | 40.00 | |
| N234 | 45.00 | 45.00 |
| TDAE oil | 41.25 | 15.00 |
| TMQ | 1.00 | 1.00 |
| 6PPD | 2.00 | 2.00 |
| Zinc Oxide | 3.00 | 3.00 |
| Stearic acid | 2.00 | 2.00 |
| SI 69 | 3.20 | |

TABLE 3

Compounding results of the silica masterbatch vs a dry-mix compound.

| Parameter | SMB | Dry-mix |
|---|---|---|
| Tensile, MPa | 18.3 | 13.3 |
| Elongation, % | 589.9 | 425.4 |
| 100% Modulus, MPa | 2.0 | 2.2 |
| 300% Modulus, Mpa | 7.5 | 8.8 |
| Durometer, Shore A | 62.0 | 66.0 |
| Tear, Die C, PPI | 205.4 | 187.1 |
| Pendulum rebound, % | 35.8 | 31.75 |
| DIN, mm3 loss | | |
| DMA | | |
| Tan Delta @ 0° C. (Wet traction) | 0.206 | 0.227 |
| Tan Delta @ 60° C. (Rolling resistance) | 0.154 | 0.179 |
| Tan Delta @ 75° C. (Rolling resistance) | 0.147 | 0.171 |
| G' @ 20° C. | 25 | 38.5 |
| G' @ 60° C. | 14.9 | 20.8 |

The compound properties illustrated in Table 3 for the SMB compound, such as wear and tensile properties, are comparable or better than the dry-mixed compound. Rolling resistance via DMA was observed to be better in SMB, which may be attributed to the better dispersion of silica in the compound. The wet traction was found to be slightly less in the SMB compound.

Example 5: Preparation of Silica Masterbatch with a High Vinyl, Oil-Extended Solution SBR Grade A. Preparation of Hydrophobated Silica Slurry.

Preparation of hydrophobated silica slurry follows the procedure in Example 4.

B. Preparation of Silica Masterbatch with Solution Rubber Crumbs.

Preparation of silica masterbatch with solution rubber crumbs follows the procedure in Example 1. A high vinyl, oil-extended solution SBR grade (Buna 5025-2HM) was used, and the amount of oil was adjusted to reflect the oil content in this grade of the rubber.

C. Compounding with Masterbatch.

Compounding with masterbatch follows the procedure in Example 4. The amount of oil was adjusted to reflect the oil content in this grade of the rubber.

TABLE 4

Recipe of the silica masterbatch with a high vinyl, oil-extended grade.

| SMB | phr |
|---|---|
| E1500 | 50.00 |
| SSBR 5025 | 68.75 |
| U7000 | 57.14 |
| TDAE oil | 18.75 |
| Silane A189 | 4.57 |
| AO | 0.40 |
| Total | 199.61 |

TABLE 5

Compounding recipe of the masterbatch.

| SMB | 139.89 |
|---|---|
| CB 24 | 30.00 |
| N234 | 45.00 |
| TDAE oil | 15.00 |
| TMQ | 1.00 |
| 6PPD | 2.00 |
| Zinc Oxide | 3.00 |
| Stearic acid | 2.00 |

TABLE 6

Compounding results of the masterbatch.

| Tensile, MPa | 13.3 |
|---|---|
| Elongation, % | 435.6 |
| 100% Modulus, MPa | 1.9 |
| 300% Modulus, Mpa | 8.3 |
| Durometer, Shore A | 63.0 |
| Tear, Die C, PPI | 194.1 |
| Pendulum rebound, % | 32.8 |
| DIN, mm3 loss | |
| DMA | |
| Tan Delta @ 0 C. (Wet traction) | 0.261 |
| Tan Delta @ 60 C. (Rolling resistance) | 0.172 |
| Tan Delta @ 75 C. (Rolling resistance) | 0.161 |
| G' @ 20 C. | 32.9 |
| G' @ 60 C. | 17.4 |

Example 6: Preparation of Silica Masterbatch with a High Surface Area Silica Grade A. Preparation of Hydrophobated Silica Slurry.

Preparation of hydrophobated silica slurry follows the procedure in Example 4. A high surface area silica was selected. This grade (Newsil HD 250MP) had a BET of 250 m²/g.

B. Preparation of Silica Masterbatch with Solution Rubber Crumbs.

Preparation of silica masterbatch with solution rubber crumbs follows the procedure in Example 1. A high vinyl, oil-extended solution SBR grade (Buna 5025) was used, and the amount of oil was adjusted to reflect the oil content in this grade of the rubber.

C. Compounding with Masterbatch.

Compounding with masterbatch follows the procedure in Example 4. The amount of oil was adjusted to reflect the oil content in this grade of the rubber.

TABLE 7

Recipe of the silica masterbatch with a high surface area silica grade.

| SMB | phr |
|---|---|
| E1500 | 50.00 |
| SSBR 5025 | 68.75 |
| Newsil 250MP | 40 |
| TDAE oil | 18.75 |
| Silane 4189 | 2.88 |
| AO | 0.4 |
| Total | 180.78 |

TABLE 8

Compounding recipe of the masterbatch.

| SMB | 138.53 |
|---|---|
| CB 24 | 30.00 |
| N234 | 45.00 |
| TDAE oil | 15.00 |
| MC Wax | 1.00 |
| TMQ | 1.00 |
| 6PPD | 2.00 |
| Zinc Oxide | 3.00 |
| Stearic acid | 2.00 |

TABLE 9

Compounding results of the masterbatch

| Tensile, MPa | 14 |
|---|---|
| Elongation, % | 437.9 |
| 100% Modulus, MPa | 2.4 |
| 300% Modulus, Mpa | 8.9 |
| Durometer, Shore A | 63.0 |
| Tear, Die C, PPI | 184.7 |
| Pendulum rebound, % | 39.5 |
| DMA | |
| Tan Delta @ 0 C. (Wet traction) | 0.3053 |
| Tan Delta @ 60 C. (Rolling resistance) | 0.1333 |
| Tan Delta @ 75 C. (Rolling resistance) | 0.1215 |
| G' @ 20 C. | 18.48 |
| G' @ 60 C. | 10.63 |

Example 7: Preparation of Silica Masterbatch with Solution-Made Rubber Only

A. Preparation of Hydrophobated Silica Slurry.

Preparation of hydrophobated silica slurry follows the procedure in Example 4.

B. Preparation of Silica Masterbatch with Solution Rubber Only.

Preparation of silica masterbatch with solution rubber follows the procedure in Example 1 with modifications. The silica and process oil were charged directly into the reactor vessel prior to the steam distillation. Vigorous agitation was applied, and the final masterbatch consisted of fine solution rubber crumbs adhering to the silica particles. A vacuum assisted filtration system was used to filter the masterbatch. The compound was then squeezed and dried prior to compounding.

C. Compounding with Masterbatch.

Compounding with masterbatch follows the procedure in Example 4. The amount of oil was adjusted to reflect the oil content in this grade of the rubber.

TABLE 10

Recipe of the silica masterbatch with a high surface area silica grade.

| SMB | phr |
|---|---|
| E1500 | 0 |
| SSBR 4526 | 100 |
| Ultrasil 7000 | 57.14 |
| TDAE oil | 37.5 |
| Silane A189 | 2.86 |
| AO | 0.4 |
| Total | 197.9 |

TABLE 11

Compounding recipe of the masterbatch.

| SMB | 138.53 |
|---|---|
| CB 24 | 30.00 |
| N234 | 45.00 |
| TDAE oil | 15.00 |
| MC Wax | 1.00 |
| TMQ | 1.00 |
| 6PPD | 2.00 |
| Zinc Oxide | 3.00 |
| Stearic acid | 2.00 |

TABLE 12

Compounding results of the masterbatch.

| Tensile, MPa | 12.8 |
|---|---|
| Elongation, % | 391.7 |
| 100% Modulus, MPa | 2 |
| 300% Modulus, Mpa | 8.8 |
| Durometer, Shore A | 63.0 |
| Tear, Die C. PPI | 166 |
| Pendulum rebound, % | 27.6 |
| DMA | |
| Tan Delta @ 0 C. (Wet traction) | 0.4255 |
| Tan Delta @ 60 C. (Rolling resistance) | 0.1522 |
| Tan Delta @ 75 C. (Rolling resistance) | 0.1365 |
| G' @ 20 C, | 23.07 |
| G' @ 60 C. | 10.6 |

The experimental results show that a silica masterbatch comprising emulsion-made rubber, solution-made rubber and hydrophobated silica has properties that are similar to properties that would be obtained by dry mixing of components to form an essentially identical composition of emulsion-made rubber, solution-made rubber and hydrophobated silica. A tire manufacturer or rubber-product manufacturer can use the silica masterbatch of the present invention more easily and at a lower expense than a comparable dry-mixed composition.

It was found, unexpectedly, that oil content is very important to the process, especially in the case of 100% SSBR SMB, where oil content is preferably higher than 20 phr, more preferably higher than 25 phr, to improve the adhesion of the SSBR rubber to the silica and create larger crumbs for filtration. It was found, unexpectedly, that the size of the crumbs can be greatly affected by the amount of silica present during steam distillation and coagulation. The size of the crumbs was much less (<1 mm) when at least 20 parts of silica, preferably at least 30 parts of silica, were in the media. Without being held to a theory, one hypothesis is that the silica behaves as partitioning agent in such setting. It was found, unexpectedly, that the SSBR crumbs formed in water, which may contain up to 30% water, were found to work much better than dry, ground SSBR rubber during the dewatering process. During the dewatering process, the wet crumbs can be easily squeezed and form a uniform matrix with other ingredients. It was found, unexpectedly, that during the drying process, the process oil will migrate between different phases and become uniformly distributed throughout the matrix, regardless of the ratio of the SSBR/ESBR, sequence of the additions and/or silica content.

Compared to a possible scenario where the SSBR rubber is dried first, then ground next, then mixed to form the SMB, the preferred process of the present invention does not contain or require a drying step for the SSBR. All rubbers and silicas are preferably mixed and are dried at the same time in one single process. The solution rubber used in the present invention is also preferably not ground, which would add substantial cost to the process. The solution rubber incorporated into a latex emulsion according to the present invention is preferably not dried or ground and is preferably received in an aqueous suspension or as a wet crumb.

Process for Making Rubber Products

A silica masterbatch produced at a rubber plant according to the present invention can be used to make a variety of rubber products, such as belts, conveyor belts, drive belts, printing rolls, printing roller, a roller wheel, track tread, flooring tile, flooring sheets, friction blocks, hoses, tubing, sheets, gaskets, hose covers, cable sheaths, shoe soles, heels for shoes, parts for vehicles including automobiles, trucks and off-road vehicles, but it is anticipated that the greatest use of the silica masterbatch will be in the tire-manufacturing industry. The silica masterbatch can be used in making tires generally and more particularly in making tire tread, tire sidewall, tire shoulder, tire bead and tire apex. The silica masterbatch will significantly improve the tire-manufacturing process.

The tire-manufacturing process can be divided into five general areas, as outlined by James Mark and Burak Erman, Science and Technology of Rubber, 3rd ed., pp 655-661. These areas are 1) rubber mixing, 2) calendaring, 3) extrusion, 4) tire building and 5) curing. The mixing area is generally described in U.S. Pat. No. 5,711,904, which is incorporated by reference. Here polymers, fillers, oils and waxes are blended in a mixer to provide a "non-productive" mix which is then blended with curatives and mixed at a lower temperature to provide a "productive" mix, which is used in downstream processes. The second unit of the tire plant is the calendaring area and is generally described in U.S. Pat. No. 4,126,720, which is incorporated by reference. The productive-mix rubber is deposited on either fabric or steel cord in such a manner that all of the fabric or cord is coated with rubber. Rubber is placed on the calendar rolls in such a manner so that it is sheeted, and the fiber or wire is embedded into the sheet. Material coming off the calendar is cut to length and width for the tire building machine. The third area of the tire plant is extrusion, where components such as tread, apex and sidewall are processed. As with the mixing area, the extrusion process is described in U.S. Pat. No. 5,711,904. Rubber from the mixing area is put through either a "cold feed" or "hot feed" extruder with a die on the end. The rubber is pushed through the die which is cut such that the rubber being extruded has the necessary dimensions to be put on the tire building machine. The fourth area of the tire plant is the tire building area, where all of the components from previous operations, including the extruded parts, calendared plies, belts and beads, are assembled on building machines to provide a "green tire." This process is outlined in more detail in U.S. Pat. No. 4,402,782, which is incorporated by reference. The fifth area of the tire manufacturing process is the vulcanization of the green tire to provide the final product. The vulcanization process is outlined in U.S. Pat. No. 5,240,669, which is incorporated by reference. The green tire is placed into a mold, and is pressed into the shape of the mold with a heated rubber bladder which is pressurized with steam or hot water. The bladder keeps the green tire at elevated temperature for sufficient time to ensure complete curing of the tire, after which the tire is released to quality control.

The present invention further provides a process for making a tire, which includes receiving a silica masterbatch made according to the present invention; making a nonproductive compound with the silica masterbatch and preferably another rubber; mixing curatives with the nonproductive compound to make a final compound; making tire components such as tread and/or sidewall with the final compound; assembling the tire components into a green tire; and vulcanizing the green tire to make a finished tire. Other rubber products can be made in a similar manner.

Embodiments of the Present Invention

A. A process for the preparation of silica masterbatch, comprising the steps of:

(a) a 5-50 wt %, preferably 10-25%, solution rubber in organic solution, preferably cyclohexane or hexane, is steam distilled in aqueous solution. The aqueous solution contains a dispersant and a coagulant commonly used in manufacturing solution rubbers.

(b) the steam distillation process is controlled such that the solution rubber form small crumbs in water with a diameter between 0.1-5 mm, preferably 0.5-2 mm. The crumb-in-water is later filtered and washed with clean water.

(c) a silica and a trimethoxy silane coupling agent are reacted in aqueous solution to form a hydrophobated silica suspension. The coupling agent chemically reacts with the surface of the silica to bond the coupling agent thereto; wherein the trimethoxy silane is 3-mercaptopropyl trimethoxy silane and/or is represented by the formula:

[(CH3O)3Si-(Alk)$n$,—(Ar)$p$]$q$[B], 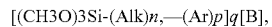

where
B is —SCN, R—C(=O)S, (if q=1) or Sx (If q=2);
Alk is a straight chained or branched bivalent hydrocarbon radical;
R is an alkyl group containing 1 to 18 carbons; m is O or 1; p is 0 or 1; m+p=1; q is 1 or 2;
Ar is an arylene radical having from 6 to 12 carbon atoms; and x is a number from 2 to 8, wherein the silane coupling agent (and/or its reaction product with water) is substantially soluble in alcohol-water mixtures containing at least about 70% water by weight;

(d) making an emulsion rubber latex at 0-200 phr level, preferably 10-50 phr level and mixing the hydrophobated silica suspension into the polymer latex;

(e) adding of solution rubber crumbs-in-water at 1-200 phr, preferably 50-150 phr, and process oils at 5-100 phr, preferably 15-50 phr, into the polymer latex;

(f) coagulating the polymer latex to form a crumb;
(g) dewatering the coagulated crumb; and
(h) drying the dewatered crumb.

A1. A process according to embodiment A, where the solution rubbers are dry rubbers and are dissolved in an organic solvent prior to the distillation.

A2. A process according to embodiment A, wherein the coupling agent is bis-(3-trimethoxysilylpropyl)-disulfide and/or bis-(3-trimethoxysilylpropyl)-tetrasulfide and/or mercaptopropyl trimethoxy silane.

A3. A process according to embodiment A, wherein the polymer is selected from the group consisting of styrene-butadiene rubber, natural rubber, neoprene rubber, acrylonitrile butadiene rubber, polybutadiene rubber, vinyl pyridine butadiene rubber and styrene butadiene termonomer rubber, EPDM, chloroprene, HNBR, SBS.

A4. A process according to embodiment A, wherein two or several solution rubbers are fed into the process simultaneously or sequentially.

A5. A process according to embodiment A, wherein the amount of calcium chloride used provides a concentration of calcium chloride in the polymer latex of less than about 2.5 wt %.

A6. A process according to embodiment A, wherein the silica is not hydrophobated but used directly instead.

A7. A process according to embodiment A, where additional additives are added during the process. Examples are: processing oils, carbon black, talc, clay, 6-PPD stabilizer, antidegradants, zinc salts, waxes, resins, and crosslinking chemicals.

A8. A process according to embodiment A7, where the process oils can be aromatic oil, naphthenic oil, TDAE, RAE, MES.

A9. A process according to embodiment A, wherein the latex polymer can be a combination of different types.

B. A process for the preparation of silica masterbatch, comprising the steps of:

(a) reacting a silica and a coupling agent in aqueous solution to form a hydrophobated silica suspension. The coupling agent chemically reacts with the surface of the silica to bond the coupling agent thereto; wherein the trimethoxy silane is 3-mercaptopropyl trimethoxy silane and/or is represented by the formula:

[(CH3O)3Si-(Alk)$n$,—(Ar)$p$]$q$[B], 

where
B is —SON, R—C(=O)S, (if q=1) or Sx (if q=2);
Alk is a straight chained or branched bivalent hydrocarbon radical;
R is an alkyl group containing 1 to 18 carbons; m is O or 1; p is 0 or 1; m+p=1;
q is 1 or 2;
Ar is an arylene radical having from 6 to 12 carbon atoms; and x is a number from 2 to 8, wherein the silane coupling agent (and/or its reaction product with water) is substantially soluble in alcohol-water mixtures containing at least about 75% water by weight;

(b) receiving an optional emulsion rubber latex at 0-200 phr level, preferably 10-50 phr level, and mixing the hydrophobated silica suspension into the polymer latex;

(c) coagulating the polymer latex from step (b) to form a crumb and keeping the crumb in water;

(d) steam distilling in an aqueous solution a 0.5-50 wt %, preferably 10-25% wt, solution rubber in organic solution, preferably cyclohexane or hexane, and adding the coagulated polymer latex from (c), a dispersant and a coagulant into the aqueous solution. The dispersant and the coagulant are ones commonly used in manufacturing solution rubbers.

(e) controlling the steam distillation process so that the solution rubber form small (preferably less than 3 mm) crumbs in water, together with the coagulated latex polymer. The crumb-In-water is later filtered and washed with clean water.

(f) dewatering the coagulated crumb; and (g) drying the dewatered crumb.

B1. A process according to embodiment B, where the solution rubbers are dry rubbers and are dissolved in an organic solvent prior to the distillation.

B2. A process according to embodiment B, wherein coupling agent is bis-(3-trimethoxysilylpropyl)-disulfide and/or bis-(3-trimethoxysilylpropyl)-tetrasulfide and/or mercaptopropyl trimethoxy silane.

B3. A process according to embodiment B, wherein the polymer is selected from the group consisting of styrene-butadiene rubber, natural rubber, neoprene rubber, acrylonitrile butadiene rubber, polybutadiene rubber, vinyl pyridine butadiene rubber and styrene butadiene termonomer rubber, EPDM, chloroprene, HNBR, SBS.

B4. A process according to embodiment B, wherein two or several solution rubbers are fed into the process simultaneously or sequentially.

B5. A process according to embodiment B, wherein the amount of calcium chloride used provides a concentration of calcium chloride in the polymer latex of less than about 2.5 wt %.

B6. A process according to embodiment B, wherein the silica is not hydrophobated but used directly instead.

B7. A process according to embodiment B, wherein additional additives are added during the process. Examples include processing oils, carbon black, talc, clay, 6-PPD stabilizer, antidegradants, zinc salts, waxes, resins, and crosslinking chemicals.

B8. A process according to embodiment B7, wherein the process oils can be aromatic oil, naphthenic oil, TDAE, RAE, MES.

B9. A process according to embodiment B, wherein the latex polymer can be a combination of different types.

C. A process for making silica masterbatch, comprising the steps of:

hydrophobating silica and mixing it into a process oil;

making a solution rubber in an organic solvent flashing off the solvent to make a solution rubber stream;

feeding the solution rubber stream to a steam distillation unit;

feeding the mixture of hydrophobated silica and process oil to the steam distillation unit; and recovering a silica-filled rubber that comprises the solution-made rubber and the hydrophobated silica without any emulsion-made rubber.

C1. The process of embodiment C, wherein the amount of process oil is preferably at least about 20 phr and more preferably at least about 25 phr, further comprising feeding a dispersant and a coagulant to the steam distillation unit; and dewatering; homogenizing, drying and baling the silica-filled rubber.

C2. The process of embodiment C or C1, wherein the hydrophobated silica, process oil and solution rubber stream comprise a media in the steam distillation unit, which preferably includes a dispersant and a coagulant, wherein the media includes at least about 20 parts of silica, preferably at least about 30 parts of silica.

C3. The process of embodiment C2, wherein the silica-filled rubber comprises particles, wherein the particles have an average size, wherein the average size of the particles is less than 3 mm, preferably less than 2 mm and more preferably less than or equal to 1 mm.

D. A process for making a silica masterbatch, comprising the steps of:

(a) operating an emulsion-rubber plant;

(b) receiving the silica-filled rubber of embodiment C, C1, C2 or C3;

(c) making a polymer latex;

(d) mixing the silica-filled rubber into the polymer latex;

(e) coagulating the polymer latex from step (d); and (f) recovering a rubber that comprises a mixture of silica, emulsion-made rubber and solution-made rubber.

D2. The process of embodiment D, wherein the silica is hydrophobated by:

(i) dissolving a trimethoxy silane coupling agent in a mixture of alcohol, acid and water to provide a trimethoxy silane coupling agent solution that contains at least about 75% water by weight, and (ii) mixing the trimethoxy silane coupling agent solution with silica and adding a base to increase the pH to form the hydrophobated silica.

D3. The process of embodiment D2, wherein the acid is a weak acid, preferably acetic acid, wherein the acid is less than 3 wt % of the mixture of alcohol, acid and water, wherein the pH of the mixture is greater than 2.5, preferably greater than 3.0 and more preferably between about 3 and about 4.5 or 5.

D4. The process of embodiment D, D1 or D2, further comprising hydrophobating silica at the emulsion-rubber plant or receiving hydrophobated silica at the emulsion-rubber plant; further comprising mixing hydrophobated silica into the polymer latex.

D5. The process of embodiment A, B, C or D, wherein a coagulating agent is used in the process, and wherein the coagulating agent is preferably calcium chloride. However, it is possible that the coagulating agent can be selected from the group consisting of calcium sulfate, magnesium sulfate, aluminum sulfate, sodium sulfate, a magnesium or calcium halide and a magnesium or calcium nitrate. Other possible coagulating agents include sulfuric acid, hydrochloric acid and nitric acid.

E. A process for making a silica masterbatch, comprising the steps of:

operating a plant for making solution rubber, wherein the typical size of crumb rubber particles is about 4-5 mm, wherein the crumb rubber particles are filtered, dried and baled;

changing the operation of the solution rubber plant to change the crumb rubber particle size to about 1-2 mm, preferably by increasing the amount dispersant, further preferably by reducing the throughput through the solution rubber plant;

withdrawing an intermediate product from the solution rubber plant, wherein the intermediate product is a wet rubber crumb having a particle size of 3 mm or less, preferably from about 1-2 mm, wherein the intermediate product is withdrawn from the plant after water is removed, preferably by filtration, but before a drying step, thereby providing an intermediate product, which is the wet rubber crumb, that has not been dried;

transporting the wet rubber crumb to an emulsion rubber plant, wherein the wet rubber crumb is either transported as wet, discrete particles having a water content of about 30 to 40 wt % or as a suspension of the rubber crumb particles in water, wherein a solution rubber crumb is provided at the emulsion rubber plant, preferably having a particle size of 0.5 to 3.0 mm;

hydrophobating silica and forming a hydrophobated silica stream;

operating the emulsion rubber plant, wherein a latex is formed;

mixing the solution rubber crumb and the hydrophobated silica stream into the latex; thereby forming a latex mixture;

coagulating the latex mixture, preferably with a calcium salt, preferably calcium chloride, thereby forming a wet mixture of silica and rubber;

drying and, preferably, baling the wet mixture of silica and rubber, thereby forming the silica masterbatch, wherein the silica masterbatch comprises solution-made rubber, emulsion-made rubber and silica.

E1. The process of embodiment E, further comprising adding a process oil into the latex with the solution rubber crumb and the hydrophobated silica stream.

E2. The process of embodiment E, wherein the silica is hydrophobated using a procedure comprising:
(i) dissolving a trimethoxy silane coupling agent in a mixture of alcohol, acid and water for promoting hydrolysis of the trimethoxy silane coupling agent for preparing the trimethoxy silane coupling agent for a condensation reaction, wherein the amount of alcohol in the mixture is no more than about 25% by weight, thereby forming a hydrolyzed trimethoxy silane coupling agent solution; and
(ii) mixing the hydrolyzed trimethoxy silane coupling agent solution with silica, wherein a base is added to increase the pH for promoting the condensation reaction for bonding the trimethoxy silane coupling agent to the silica to form the hydrophobated silica;

E3. The process of embodiment E2, wherein the acid is a weak acid, preferably acetic acid, wherein the pH of the mixture of alcohol, acid and water is more than 2.5, preferably ranging between 2.8 and 4.8, more preferably ranging between 3.0 and 4.5.

E4. The process of embodiment E2, wherein the acid is a weak acid, wherein the mixture of alcohol, acid and water contains no more than 5 wt % acid.

E5. The process of embodiment E4, wherein the mixture of alcohol, acid and water contains no more than 2 wt % acid, preferably no more than 1 wt % acid.

E6. The process of embodiment E4 or E5, wherein the mixture of alcohol, acid and water contains at least about 85 wt % water, preferably at least 90 wt % water, and more preferably at least 95 wt % water.

E7. The process of embodiment E3, wherein the base is preferably a metal hydroxide, more preferably sodium hydroxide, wherein the base is preferably used to approximately neutralize the mixture of silane coupling agent solution and silica, wherein preferably the pH is increased to between 6 and 9, wherein more preferably the pH is increased to between 6.5 and 8.0.

E8. The process of embodiment A, B, C, D or E, wherein the silica has a BET surface area of between about 100 and about 350 m$^2$/g, wherein the BET surface area is preferably greater than about 200 m$^2$/g, and wherein the BET surface area is more preferably greater than about 220 m$^2$/g.

E9. The process of embodiment E8, wherein the CTAB surface area of the silica is between about 100 and about 350 m$^2$/g.

E10. The process of embodiment E9, wherein the ratio of BET/CTAB is between about 0.8 and about 1.3.

E11. The process of embodiment E, wherein the wet rubber crumb from the solution-rubber plant is clear, wherein a clear solution rubber is made at the solution-rubber plant, and wherein an extender oil is not used in making the wet rubber crumb at the solution-rubber plant. The wet rubber crumb can be said to contain less than 10, 5, 1 or 0.5 wt % extender oil.

E12. The process of embodiment E, further comprising adding silica for changing the operation of the solution rubber plant to reduce the size of the crumb rubber particles, wherein the size of the crumb rubber particles is less than or equal to about 3 mm, preferably no larger than 2 mm, more preferably no larger than 1 mm.

F. A process for making a silica masterbatch, comprising the steps of:
(a) receiving a solution-made rubber at an emulsion-rubber plant;
(b) making a polymer latex at the emulsion-rubber plant;
(c) mixing the solution-made rubber into the polymer latex;
(d) coagulating the polymer latex from step (d); and
(e) recovering a combined rubber that comprises a mixture of emulsion-made rubber and solution-made rubber.

F1. The process of embodiment F, wherein the solution-made rubber is received as a dry rubber, which is ground prior to adding it to the polymer latex, as a suspension of particles in water or as a wet crumb, wherein the solution-made rubber is preferably received as a suspension or as a wet crumb, wherein the solution rubber is more preferably received as a wet crumb, and wherein the wet crumb may contain up to about 30% water by weight.

F2. The process of embodiment F or F1, further comprising adding silica into the polymer latex, wherein the silica is received preferably as a wet-cake silica, thereby eliminating the expense of drying and packaging silica at a silica manufacturing plant.

F3. The process of embodiment F2, wherein the silica is hydrophobated.

F4. The process of embodiment F3, wherein the silica is hydrophobated by:
(i) dissolving a trimethoxy silane coupling agent in a mixture of alcohol, acid and water to provide a trimethoxy silane coupling agent solution that contains at least about 75% water by weight, preferably 85% water by weight, preferably a weak acid, preferably acetic acid, the mixture preferably having a pH of between 2.75 and 5, and
(ii) mixing the trimethoxy silane coupling agent solution with silica and adding a base to increase the pH to form the hydrophobated silica.

F5. The process of embodiment F4, wherein the trimethoxy silane coupling agent is 3-mercaptopropyl trimethoxy silane, bis-(3-trimethoxysilylpropyl)-disulfide and/or bis-(3-trimethoxysilylpropyl)-tetrasulfide.

F6. The process of embodiment F, F1, F2, F3, F4 or F5, further comprising mixing a process oil into the polymer latex.

F7. The process of embodiment F6, wherein the amount of process oil in the combined rubber is higher than 20 phr, preferably higher than 25 phr, and wherein the amount of process oil in the combined rubber is preferably within the range of 30 to about 50 phr in the combined rubber. It is preferable in any embodiment of the invention to add a sufficient amount of process oil to avoid phase separation between silica and rubber.

F8. The process of any one of embodiments F2-F7, wherein the process oil is distributed uniformly within the combined rubber regardless of the ratio of the SSBR/ESBR, the sequence of the additions or the silica content.

F9. The process of any one of embodiments F and F2-F8, wherein the solution-made rubber is clear, and wherein an extender oil is not used in making the solution-made rubber.

F10. The process of any one of embodiments A, B, C, D, E and F, wherein an extender oil is not used in making the solution-made rubber.

G. A process for making silica-filled solution rubber, comprising the steps of:
hydrophobating silica to make the silica compatible with oil;
mixing the hydrophobated silica into a process oil;
making a solution rubber in an organic solvent;
flashing off the solvent to make a solution rubber stream;
feeding the solution rubber stream to a steam distillation unit;
feeding the mixture of hydrophobated silica and process oil to the steam distillation unit, preferably with a dispersant and a coagulant; and
recovering a silica-filled solution-made rubber that comprises the solution rubber and the hydrophobated silica without any emulsion-made rubber, wherein the silica-filled solution-made rubber has an average particle size of less than about 3 mm, preferably less than about 2 mm, and more preferably less than about 1 mm, possibly less than about 0.5 mm.

H. A process for making a silica masterbatch, comprising the steps of:
operating an emulsion rubber plant;
receiving the silica-filled solution-made rubber of embodiment G at the emulsion rubber plant, wherein the silica-filled solution-made rubber is preferably a in the form of a wet crumb or is a crumb dispersed in water;
making a polymer latex;
mixing the silica-filled solution-made rubber into the polymer latex to form a latex mixture;
mixing a coagulating agent into the latex mixture to form a coagulated mixture; and
recovering a silica masterbatch from the coagulated mixture.

J. An article comprising a silica-filled rubber as a significant component, wherein the silica-filled rubber is made using a silica masterbatch made according to the process of any one of embodiments A, B, C, D, E, F, G or H or the subparts of these embodiments.

J1. The article of embodiment J, wherein the article is selected from the group consisting of belts, conveyor belts, drive belts, printing rolls, printing roller, a roller wheel, track tread, flooring tile, flooring sheets, friction blocks, hoses, tubing, sheets, gaskets, hose covers, cable sheaths, shoe soles, heels for shoes and parts for vehicles including automobiles, trucks and off-road vehicles.

J2. A tire comprising a silica-filled rubber, wherein the silica-filled rubber is made using a silica masterbatch made according to the process of any one of embodiments A, B, C, D, E, F, G or H or the subparts of these embodiments.

J3. The tire of embodiment J2, wherein the tire comprises components selected from the group consisting of tire tread, tire sidewall, tire shoulder, tire bead and tire apex, and wherein at least one of the components comprises the silica masterbatch.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

What is claimed is:

1. A process for making a masterbatch of silica and solution-made rubber, comprising the steps of:
making a hydrophobated silica slurry by:
mixing silica into water in a vessel;
preparing an aqueous solution of silane; and
adding the aqueous solution of silane to the vessel to make the hydrophobated silica slurry;
adding a dispersant, a coagulant and water to a reactor, thereby forming an aqueous dispersant-coagulant mixture;
adding a mixture of solution-made rubber and organic solvent to the reactor;
adding the hydrophobated silica slurry to the reactor;
adding a process oil to the reactor to make a reactor mixture;
steam distilling the reactor mixture; and
recovering a masterbatch of silica and solution-made rubber.

2. The process of claim 1, further comprising heating the aqueous dispersant-coagulant mixture to at least 70° C.

3. The process of claim 1, further comprising preheating the mixture of solution-made rubber and organic solvent to at least 30° C.

4. The process of claim 1, wherein the amount of each of the dispersant and the coagulant in the aqueous dispersant-coagulant mixture is between about 50 and about 500 ppm.

5. The process of claim 1, wherein the solids level in the mixture of solution-made rubber and organic solvent is between 10 and 25 wt %.

6. The process of claim 1, further comprising adding a base to the vessel after the silica and the aqueous solution of silane are added to the vessel.

7. The process of claim 1, wherein the oil content in the masterbatch is at least 20 phr.

8. The process of claim 7, wherein extender oil is not added to the process.

9. The process of claim 1, wherein the reactor mixture contains at least about 20 phr of silica.

10. The process of claim 1, wherein the masterbatch contains less than 5 wt % extender oil, wherein the oil content in the masterbatch is at least 25 phr, and wherein the reactor mixture contains at least 30 phr of silica.

11. The process of claim 1, wherein the coagulant is calcium chloride.

12. The process of claim 1, wherein the hydrophobated silica slurry is made by (i) dissolving a trimethoxy silane coupling agent in a mixture of alcohol, a weak acid and water to provide a trimethoxy silane coupling agent solution that contains at least 75% water by weight, and (ii) mixing the trimethoxy silane coupling agent solution with silica and adding a base to increase the pH to form the hydrophobated silica, wherein the trimethoxy silane coupling agent bonds to the silica and provides a site for bonding to rubber.

13. The process of claim 1, further comprising dewatering, homogenizing, drying and baling the masterbatch.

* * * * *